United States Patent
Thieblemont et al.

(10) Patent No.: US 8,735,530 B2
(45) Date of Patent: May 27, 2014

(54) POLYAMIDE MANUFACTURING PROCESS

(75) Inventors: Virginie Thieblemont, Millery (FR); Jean-Francois Thierry, Francheville (FR)

(73) Assignee: Rhodia Operations, Aubervilliers (FR)

( * ) Notice: Subject to any disclaimer, the term of this patent is extended or adjusted under 35 U.S.C. 154(b) by 72 days.

(21) Appl. No.: 13/257,370

(22) PCT Filed: Mar. 9, 2010

(86) PCT No.: PCT/EP2010/052957
§ 371 (c)(1),
(2), (4) Date: Nov. 1, 2011

(87) PCT Pub. No.: WO2010/105939
PCT Pub. Date: Sep. 23, 2010

(65) Prior Publication Data
US 2012/0046438 A1  Feb. 23, 2012

(30) Foreign Application Priority Data

Mar. 20, 2009  (FR) ..................................... 09 51779

(51) Int. Cl.
*C08G 69/02*  (2006.01)

(52) U.S. Cl.
USPC ........... 528/170; 528/310; 528/332; 528/335; 528/336

(58) Field of Classification Search
USPC .......................... 528/170, 310, 332, 335, 336
See application file for complete search history.

(56) References Cited

U.S. PATENT DOCUMENTS

| | | |
|---|---|---|
| 4,442,260 A | 4/1984 | Larsen |
| 5,306,804 A | 4/1994 | Liehr et al. |
| 5,432,254 A | 7/1995 | Liehr et al. |
| 6,191,251 B1 * | 2/2001 | Pagilagan ..................... 528/313 |
| 2009/0299028 A1 | 12/2009 | Kikuchi et al. |

OTHER PUBLICATIONS

International Search Report (PCT/ISA/210) issued on May 21, 2010, by European Patent Office as the International Searching Authority for International Application No. PCT/EP2010/052957.

* cited by examiner

*Primary Examiner* — Gregory Listvoyb
(74) *Attorney, Agent, or Firm* — Dentons US LLP

(57) ABSTRACT

A method for making polyamide is described. More particularly, a method for making a polyamide from at least one diacid and one diamine, that includes a step of concentrating an aqueous solution of diacid and diamine salt up to a salt weight concentration higher than 85%, and a polymerization step up to a desired polymerization degree is described.

14 Claims, No Drawings

POLYAMIDE MANUFACTURING PROCESS

This application is the United States national phase of PCT/EP2010/052957, filed Mar. 9, 2010, and designating the United States (published in the French language on Sep. 23, 2010, as WO 2010/105939 A1; the title and abstract were also published in English), which claims priority under 35 U.S.C. §119 of FR 0951779, filed Mar. 20, 2009, each hereby expressly incorporated by reference in its entirety and each assigned to the assignee hereof.

The invention relates more particularly to a process for manufacturing polyamide from at least one diacid and from at least one diamine, comprising a step of concentrating an aqueous solution of diacid and diamine salt to a weight concentration of salt greater than 85%, and to a step of polymerizing to the desired degree of polymerization.

The invention relates, in particular, to a batch process for manufacturing a polyamide.

Polyamides are polymers of considerable industrial and commercial importance. Thermoplastic polyamides are obtained by condensation of two different types of monomers or of a single type of monomer. Having several different monomers in one and the same type can be envisaged.

The invention applies to the polyamides resulting from two different types of monomers, such as for example polyhexamethylene adipamide.

Conventionally, polyamides are prepared from at least one diacid monomer and from at least one diamine monomer, in solution in an organic solvent or in a mixture of organic solvents, in water, or in a mixed solvent/water system.

The diacid is generally a dicarboxylic acid. The most common diacid monomer is adipic acid.

As regards the diamine monomer, this is generally hexamethylenediamine.

Besides the adipic acid (AA) and the hexamethylenediamine (HMDA), the polyamides may be derived from other diacid or diamine monomers, even from amino acid monomers or lactams (up to 25 mol %).

The most widespread industrial process for manufacturing a polyamide from two different monomers, a diacid and a diamine, consists in forming a salt between the diacid and the diamine: for example, in the case where the diacid is adipic acid and the diamine is hexamethylenediamine, the salt formed is hexamethylenediammonium adipate, better known under the name "N salt" or Nylon salt. The salt solution generally contains stoichiometric quantities of diacids and diamines. The expression "stoichiometric quantities" is understood to mean mixtures for which the molar ratio between the diacid(s) and the diamine(s) is between 0.97 and 1.03, preferably between 0.99 and 1.01. In other words, the expression "stoichiometric quantities" is understood to mean that the ratio between the total number of moles of diacid(s) and the total number of moles of diamine(s) is between 0.97 and 1.03, preferably between 0.99 and 1.01. The solution of this "N salt", which contains at least 50% by weight of "N salt", is optionally concentrated by evaporation of water. The polyamide is obtained by heating this solution of "N salt", at high temperature and pressure, in order to evaporate the water and activate the polymerization reaction, while keeping the medium in the liquid state.

Other processes exist that start from non-stoichiometric mixtures with, in general, a high excess of diacid relative to the diamine. For example, such a process is described in application U.S. Pat. No. 4,442,260. However, this type of process requires the use of an additional step of re-establishing the stoichiometry which is essential in order to obtain the polymer. This step must be carried out at high temperature and concentration, which makes the adjustment of the final molar ratio tricky.

The solution of "N salt", which has or has not been concentrated, generally contains between 50 and 80% by weight of salt.

During the polymerization phase of the solution by heating at high temperature and pressure, it is necessary to remove the water still present in this solution, and also the water generated by the polymerization reaction.

The polymerization phase is generally carried out in a "polymerizer" constituted by an autoclave. The amount of water to be removed during this phase is high, and the removal of this water contributes, to a great extent, to the duration of the polymerization cycle (known as the cycle time), thus limiting the productivity.

It is therefore sought to reduce the cycle time in the autoclave, in order to improve the productivity of the process. Indeed, since the autoclave is an expensive and complex device, the reduction of the cycle time in the autoclave represents a considerable advantage.

For this purpose, the invention proposes a process for manufacturing polyamide from at least one diacid and from at least one diamine, comprising the following steps:
  a) concentration by evaporation of water from an aqueous solution of diacid and diamine salt obtained by mixing at least one diacid and at least one diamine in stoichiometric quantities, until a homogeneous aqueous solution is obtained, of which the weight concentration in water of the dissolved species is greater than 85%, advantageously greater than or equal to 86%, preferably greater than or equal to 87%, more preferably still greater than or equal to 88%; and
  b) polymerization with removal of water up to the desired degree of polymerization.

This process, by significantly concentrating the salt solution in a step of concentrating via evaporation of water, makes it possible to reduce the cycle time of the autoclave, since the amount of water to be removed in the autoclave is smaller. This leads to the increase of the productivity of the process. Moreover, in the process of the invention, the loss of diamine, that is to say the amount carried away at the same time as the water vapour during the evaporation step, remains acceptable, and the progression of the reaction during step a) is slow enough to avoid any appearance of solid phase linked to the presence of oligomers in the medium.

According to one particular embodiment of the invention, the weight concentration in the water of the dissolved species at the end of step a) is greater than 90%.

The expression "dissolved species" should be understood to mean all of the diacid and diamine species present in the medium in free or ionized (salt) form or other form, to which the amino acid or lactam monomers are added where appropriate.

The solution of diacid and diamine salt is manufactured according to a process known to a person skilled in the art. It may be prepared by addition of the diacid, in particular adipic acid, to the diamine, in particular hexamethylenediamine, or vice versa, in an aqueous medium, with or without the removal of the heat produced by the neutralization reaction.

The concentrating step a) of the process of the invention is generally carried out in an "evaporator", which equipment is known to a person skilled in the art. It may be, for example, a static evaporator with an internal heat exchanger of coil type, an evaporator with a recirculation loop to an external exchanger, etc.

The solution, during step a), is advantageously kept stirring. This allows a good homogenization of the solution. The stirring means are the means known to a person skilled in the art; they may be, for example, mechanical stirring, or a recirculation via a pump or via a thermosiphon.

The solution introduced in step a) may be a preheated solution.

The unpolymerized or partially polymerized salt solution is advantageously maintained, in step a), at a temperature θ that is, at any moment, sufficient to keep the medium in the liquid state and avoid any appearance of solid phase.

Indeed, in order to avoid the solidification or the crystallization of the more or less polymerized solution of monomers, it is advantageous to maintain it at a temperature above its solid appearance temperature at any moment.

Advantageously, the temperature θ for maintaining the solution, at any moment, in the liquid state during step a) is above the solid appearance temperature $θ_c$ of the solution, advantageously $θ≥θ_c+3°$ C., preferably $θ≥θ_c+5°$ C.

The evaporator from step a) generally comprises a heat exchanger; the solution flows in this exchanger and is thus heated. Advantageously the exchanger is fed by pressurized steam.

The pressure in the evaporator during step a) is advantageously less than or equal to 0.5 MPa, preferably less than or equal to 0.3 MPa. Advantageously, this pressure is, at any moment, high enough so that the condition relating to the temperature that was seen above: θ above the solid appearance temperature $θ_c$ of the solution, advantageously $θ≥θ_c+3°$ C., preferably $θ≥θ_c+5°$ C., is satisfied, so as to avoid any appearance of solid phase.

The pressure during step a) may be set at a constant value, or according to a particular pressure profile (for example according to successive holds).

The duration of the concentrating step a) is generally between 20 and 120 minutes.

The weight concentration of salt of the aqueous solution of diacid and diamine salt, before step a), may vary from 40 to 70%. It is advantageously between 50 and 70%.

The concentration step a) is preferably carried out by keeping the solution under an oxygen-free atmosphere, so as to avoid any contact of the solution with oxygen. This is carried out, for example, by using, in the process of the invention, a salt that is free of dissolved oxygen, or by using an atmosphere of inert gas or of water vapour generated by the boiling of the solution.

The mixture resulting from step a) is preferably transferred from the evaporator to a reaction chamber in which the polymerization step b) takes place with removal of water.

The polymerization step b) consists of a polycondensation preferably carried out in at least one "polymerizer" constituted by an autoclave, according to the customary conditions of the polycondensation cycle. The evaporator may supply several "polymerizers".

Step b) comprises at least one step b1) of pressurized polymerization. The pressure during this step b1) is generally between 1.5 and 2.5 MPa.

Another noteworthy feature of the process of the invention is that it comprises at least one of the following conventional steps:
  a step b2) of expansion of the polymerization medium in order to remove the residual water via evaporation;
  a step b3) of maintaining the temperature of the polymer, under atmospheric pressure or reduced pressure; and
  a step b4) of forming (preferably in the form of granules) the polyamide obtained.

According to step b3), the polyamide may then be kept for a given time at a polymerization temperature under atmospheric pressure or reduced pressure in order to obtain the desired degree of polymerization.

The latter finishing steps are those used in the conventional industrial processes for manufacturing a polyamide from an aqueous solution of diacid and diamine salt.

The duration of step b) is generally between 90 and 240 minutes. The process of the invention makes it possible to reduce this duration by several minutes, or even by more than about ten minutes. It also makes it possible to obtain a larger amount of polymer per cycle. Indeed, for a given reactor volume, since the solution obtained after step a) is more concentrated than in the known processes, it is possible to introduce a larger amount of more or less polymerized monomers into the autoclave; therefore, in the end a larger amount of polymer is obtained in the autoclave without changing the initial filling level of the latter.

Advantageously, the apparatuses of the process of the invention are equipped with thermal insulation in order to limit heat exchange with the surroundings and thus limit heat losses.

The process of the invention is advantageously a batch process.

The process of the invention may be used for manufacturing polyhexamethylene adipamide starting from adipic acid as the diacid monomer and from hexamethylenediamine as the diamine monomer.

As the diacid monomer, in addition to adipic acid, mention may also be made of glutaric, suberic, sebacic, dodecanedioic, isophthalic, terephthalic, azelaic, pimelic, naphthalenedicarboxylic and 5-sulphoisophthalic acids, for example. It is possible to use a mixture of several diacid monomers.

Advantageously, the diacid monomer comprises at least 80 mol % of adipic acid.

As the diamine monomer, in addition to hexamethylenediamine, mention may also be made of heptamethylenediamine, tetramethylenediamine, octamethylenediamine, nonamethylenediamine, decamethylenediamine, 2-methylpentamethylenediamine, undecamethylenediamine, dodecamethylenediamine, xylylenediamine and isophoronediamine. It is possible to use a mixture of several diamine monomers.

Advantageously, the diamine monomer comprises at least 80 mol % of hexamethylenediamine.

It is also possible to use comonomers such as lactams or amino acids, such as for example caprolactam, aminocaproic acid, laurolactam, etc.

When comonomers are used, the latter are preferably added as a mixture with the initial diacid and diamine salt. In this case, the dissolved species, in the sense of the present invention, also comprise these comonomers.

Additives may be introduced during the process of the invention. Mention may be made, as examples of additives, of nucleating agents such as talc, matifying agents such as titanium dioxide or zinc sulphide, heat or light stabilizers, bioactive agents, antisoiling agents, catalysts, chain limiters, etc. These additives are known to a person skilled in the art. This list is in no way exhaustive.

The polymer is then generally extruded or formed.

The polymer is generally made into the form of granules.

These granules are then used in a wide number of applications, especially for the manufacture of yarns, fibres or filaments, or for forming articles by moulding, injection moulding or extrusion. They may especially be used in the field of engineering plastics, generally after a formulation step.

Other details or advantages of the invention will appear more clearly in light of the examples given below.

EXAMPLES

Example 1

Comparative

A polyamide PA-6,6 is prepared from a 52 wt % aqueous solution of N salt charged in an external recirculation-type evaporator with 0.20 wt % of a 32.7 wt % aqueous solution of hexamethylenediamine, 1.6 wt % of a 60 wt % aqueous solution of caprolactam and 8.5 ppm of antifoaming agent (silicone composition). The mixture is heated to 153.0° C. under an absolute pressure of 0.24 MPa. At the end of the evaporation, the concentration of dissolved species of the solution is 84.7 wt %. This solution is then transferred into an autoclave. The autoclave is heated so as to obtain an autogenous pressure of 1.85 MPa. During this pressurized polymerization phase, a 20 wt % aqueous dispersion of titanium oxide is added in an amount such that the final polymer contains 0.3 wt % of titanium oxide. The pressurized polymerization phase lasts 60 min, then the pressure is gradually reduced to atmospheric pressure. The reactor is kept under atmospheric pressure for 26 minutes and the temperature attained by the reaction mass at the end of this step is 272° C. Then the reactor is put under a nitrogen pressure between 0.4 and 0.5 MPa in order to be able to extrude the polymer in the form of rods, that are cooled with water and chopped so as to obtain granules.

The polyamide PA-6,6 obtained has a relative viscosity of 41 measured in 90% formic acid, at a concentration of 8.4 wt %; and amine end groups of 49.2 milliequivalents per kilogram of polymer.

Example 2

Invention

A polyamide PA-6,6 is prepared from a 52 wt % aqueous solution of N salt charged in an external recirculation-type evaporator with 0.23 wt % of a 32.7 wt % aqueous solution of hexamethylenediamine, 1.6 wt % of a 60 wt % aqueous solution of caprolactam and 8.5 ppm of antifoaming agent (silicone composition).

The polyamide is prepared according to conditions identical to those used in example 1, except that an amount of aqueous solution of N salt is used that is 2 wt % higher relative to the amount used in example 1, that the mixture is heated to 156.0° C. during the evaporation and that the concentration of dissolved species of the solution at the end of the evaporation is 86.5 wt %.

The increase in concentration of the solution of N salt at the end of the evaporation phase made it possible to increase by 2% the mass of polymer produced per cycle while retaining the same cycle time of the autoclave. The evaporation time of the solution of N salt increased without impacting the output of the production plant nor the cycle time of the autoclave.

The polyamide PA-6,6 obtained has the same properties as that obtained in example 1: a relative viscosity of 41 measured in 90% formic acid at a concentration of 8.4 wt %; and amine end groups of 49.4 milliequivalents per kilogram of polymer.

Example 3

Comparative

A polyamide PA-6,6 is prepared from a 52 wt % aqueous solution of N salt charged in an external recirculation-type evaporator with 9 ppm of antifoaming agent (silicone composition). The mixture is heated to 154.0° C. under a pressure of 0.24 MPa. At the end of the evaporation, the concentration of dissolved species of the solution is 85 wt %. This solution is then transferred into an autoclave. The autoclave is heated so as to obtain an autogenous pressure of 1.85 MPa. The pressurized polymerization phase lasts 42 min, then the pressure is gradually reduced to atmospheric pressure. The reactor is kept under atmospheric pressure for 20 minutes and the temperature attained by the reaction mass at the end of this step is 277° C. Then the reactor is put under a nitrogen pressure between 0.4 and 0.5 MPa in order to be able to extrude the polymer in the form of rods, that are cooled with water and chopped so as to obtain granules.

The polyamide PA-6,6 obtained has a viscosity index of 135.5 mL/g measured in 90% formic acid, at a concentration of 0.5 g/100 mL.

Example 4

Invention

A polyamide PA-6,6 is prepared under the same conditions as those used in Example 3, except that the mixture is heated to 157.4° C. during the evaporation, and that the concentration of dissolved species of the solution at the end of the evaporation is 87.0 wt %.

The increase in concentration of the solution of N salt at the end of the evaporation phase made it possible to reduce the cycle time of the autoclave by 3 min and therefore to increase the productivity of the plant. The evaporation time of the solution of N salt was not increased, in particular by virtue of the heating capacity of the evaporator.

The polyamide PA-6,6 obtained has the same properties as that obtained in Example 3: a viscosity index of 135.3 mL/g measured in 90% formic acid, at a concentration of 0.5 g/100 mL.

The invention claimed is:

1. A method for manufacturing a polyamide from at least one diacid and from at least one diamine, comprising the following steps:
   a) concentrating by evaporating water from an aqueous solution of diacid and diamine salt obtained by mixing at least one diacid and at least one diamine in stoichiometric quantities, until a homogeneous aqueous solution is obtained, of which the weight concentration in water of the dissolved species is greater than 85%, wherein the pressure during step a) is less than 0.3 MPa; and
   b) polymerizing with removal of water up to a desired degree of polymerization, comprising at least one step b1) of polymerizing under pressure.

2. The method according to claim 1, wherein the temperature $\theta$, during step a), is, at any moment, greater than or equal to $\theta_c+3°$ C., wherein $\theta_c$ is the crystallization temperature of the solution.

3. The method according to claim 1, wherein the weight concentration of salt of the aqueous solution of diacid and diamine salt, before step a), is between 50% and 70%.

4. The method according to claim 1, wherein the mixture obtained at the end of step a) is transferred into at least one polymerization reactor.

5. The method according to claim 1, wherein the method further comprises at least one of the following steps:
   a step b2) of expanding the polymerization medium in order to remove residual water via evaporation;
   a step b3) of maintaining the temperature of the polymer, under atmospheric pressure or reduced pressure; and
   a step b4) of forming the polyimide obtained.

6. The method according to claim 1, wherein the process is a batch process.

7. The method according to claim 1, wherein the diacid monomers are selected from the group consisting of adipic, glutaric, suberic, sebacic, dodecanedioic, isophthalic, terephthalic, azelaic, pimelic, naphthalenedicarboxylic and 5-sulphoisophthalic acids.

8. The method according to claim 1, wherein the diamine monomers are selected from the group consisting of hexamethylenediamine, heptamethylenediamine, tetramethylenediamine, octamethylenediamine, nonamethylenediamine, decamethylenediamine, 2-methylpentamethylenediamine, undecamethylenediamine, dodecamethylene-diamine, xylylenediamine and isophoronediamine.

9. The method according to claim 1, wherein the diacid monomer comprises at least 80 mol % of adipic acid.

10. The method according to claim 1, wherein the diamine monomer comprises at least 80 mol % of hexamethylenediamine.

11. The method according to claim 1, wherein the weight concentration in water of the dissolved species is greater than or equal to 86%.

12. The method according to claim 1, wherein the weight concentration in water is greater than or equal to 87%.

13. The method according to claim 1, wherein the weight concentration in water of the dissolved species is greater than or equal to 88%.

14. The method according to claim 5, wherein if the method further comprises step b4), then step b4) comprises forming the polyamide in the form of granules.

* * * * *